Patented May 31, 1932

1,860,532

UNITED STATES PATENT OFFICE

GEORGE R. ENSMINGER, OF NEW BRUNSWICK, NEW JERSEY, ASSIGNOR TO E. I. DU PONT DE NEMOURS & COMPANY, OF WILMINGTON, DELAWARE, A CORPORATION OF DELAWARE

NONCHALKING COATING COMPOSITION

No Drawing. Application filed December 15, 1930. Serial No. 502,622.

This invention relates to coating compositions. More particularly it relates to coating compositions of the type using cellulose derivatives as a vehicle. Still more particularly it relates to the use with such lacquers of materials which will decrease the chalking tendency which heretofore has rendered their use to that extent unsatisfactory.

One of the inherent properties of pyroxylin enamels in general and particularly those which contain the commonly used white pigments, is the tendency of the composition to disintegrate under the influence of the elements and thus leave minute particles of the pigments exposed on the surface. This disintegration and resulting exposure of the minute pigment particles is called chalking.

This invention has as an object the provision of means whereby this disintegration of lacquer enamels under the influence of the elements will be reduced or stopped. A further object of the invention is the provision of means which will prevent the chalking of lacquers. Other objects of the invention will be in part apparent and in part hereinafter set forth.

These objects are accomplished by the following invention which, generally speaking, consists in adding to lacquers substances which prevent the disintegration of the lacquer and the chalking of its surface. More particularly the invention consists in the addition to lacquers either as pigments or as additions to the pigments, suitable quantities of leaded zinc oxide. Leaded zinc oxide, it will be understood, is zinc oxide containing a proportion of lead sulfate. Low-leaded zinc oxide is advantageously used in this connection, not that better non-chalking results are obtained, but that low-leaded zinc oxide is most suitable for use in nitrocellulose coatings. The incorporation of the leaded zinc oxide into the lacquer can be done in any one of the numerous ways used to incorporate a lacquer and a pigment.

The examples of protective coatings, using nitrocellulose as the cellulose derivative, which follow will serve to illustrate several embodiments of the invention.

Example I

| | |
|---|---|
| Low viscosity nitrocellulose | 10 |
| Damar resin | 3 |
| Castor oil | 3 |
| Dibutyl phthalate | 3 |
| Leaded zinc oxide | 15 |
| Solvents and diluents | 68 |
| | 100% |

Example II

| | |
|---|---|
| Benzyl cellulose | 9.9 |
| Damar resin | 2.6 |
| Dibutyl phthalate | 1.7 |
| Chrome green | .8 |
| Leaded zinc oxide | 4.6 |
| Bone black | 2.1 |
| Denatured alcohol | 10.0 |
| Acetic acid ester of the monoethyl ether of ethylene glycol | 3.6 |
| Butyl acetate | 3.8 |
| Ethyl acetate | 30.1 |
| Toluol | 27.7 |
| Amyl alcohol | 3.1 |
| | 100.0% |

Example III

| | |
|---|---|
| Nitrocellulose | 10.0 |
| Damar resin | 2.5 |
| Ester gum | 2.5 |
| Castor oil | 3.0 |
| Dibutyl phthalate | 3.0 |
| Leaded zinc oxide | 15.0 |
| Solvents and diluents | 64.0 |
| | 100.0% |

Example IV

| | |
|---|---|
| Low viscosity nitrocellulose | 10 |
| Damar resin | 3 |
| Castor oil | 3 |
| Dibutyl phthalate | 3 |
| Prussian blue | 3 |
| Leaded zinc oxide | 12 |
| Solvents and diluents | 66 |
| | 100% |

*Example V*

| | |
|---|---|
| Low viscosity cellulose acetate | 12.0 |
| Deodorized sardine oil | 6.0 |
| Monoethylin benzoyl benzoate | 3.0 |
| Chrome yellow | 0.9 |
| Leaded zinc oxide | 5.6 |
| Bone black | 2.5 |
| Acetone | 10.5 |
| Denatured alcohol | 6.3 |
| Ethyl acetate | 8.4 |
| Light acetone oil | 14.0 |
| Toluol | 14.0 |
| Methyl ether of ethylene glycol | 15.4 |
| Diacetone alcohol | 1.4 |
| | 100.0% |

Experiments have been performed under actual conditions which indicate that the protective coatings above described fully accomplish the object for which they were designed. In tests run in Florida, a State whose climate is so severe that ordinary coatings chalk in very short periods of time, lacquer enamels made up after these formulæ showed no signs of chalking long after previous lacquers were badly chalked and far on the road toward entire disintegration.

It will be apparent that while the use of these coating compositions will include automobile finishes, they can be used as well to coat objects such as wood, metal, refrigerators, furniture, toys and in short, anything which needs a protective coating.

The advantages of this invention are that a protective coating is provided which is relatively free from chalking when subjected to exposure to the weather, which retains its lustre under the most adverse conditions, which by affording freedom from chalking, requires less frequent cleaning and polishing, which gives a longer lasting coat and one which resists checking, cracking, flaking, and peeling to a very high degree.

It will be apparent that many changes can be made in the proportions of constituents used in the lacquers, and that changes in materials can be used without departing from the spirit of the invention.

As many apparently widely different embodiments of this invention may be made without departing from the spirit and scope thereof, it is to be understood that I do not limit myself to the specific embodiments thereof except as defined in the appended claims.

I claim:

1. A coating composition of improved resistance to chalking containing a cellulose compound and a pigment comprising leaded zinc oxide.

2. A coating composition of improved resistance to chalking containing a cellulose ester and a pigment comprising leaded zinc oxide.

3. A coating composition of improved resistance to chalking containing cellulose nitrate and a pigment comprising leaded zinc oxide.

4. A coating composition of improved resistance to chalking containing a cellulose compound, a white pigment, and leaded zinc oxide.

5. The method of preventing the chalking and disintegration of coating compositions of the cellulose derivative type consisting in the admixture therewith of leaded zinc oxide.

6. The method of preventing the chalking and disintegration of coating compositions of the type wherein cellulose derivatives are used as a vehicle comprising the admixture, with a coating composition containing a cellulose derivative, of a pigment consisting of leaded zinc oxide.

7. The method of preventing the chalking and disintegration of coating compositions of the type wherein cellulose derivatives are used as a vehicle comprising the admixture, with a coating composition containing a cellulose derivative, a resin, an oil, solvents and diluents, of a pigment containing a proportion of leaded zinc oxide.

8. The method of preventing the chalking and disintegration of coating compositions of the type wherein cellulose derivatives are used as a vehicle comprising the admixture, with a coating composition containing nitrocellulose, damar resin, castor oil, dibutyl phthalate, solvents and diluents, of a pigment consisting of leaded zinc oxide.

9. The method of preventing the chalking and disintegration of coating compositions of the type wherein cellulose derivatives are used as a vehicle consisting in the admixture, with a coating composition containing a cellulose derivative, of a pigment containing a proportion of leaded zinc oxide.

10. The method of preventing chalking and disintegration of coating compositions of the type wherein cellulose derivatives are used as a vehicle, consisting in the admixture with a coating composition containing a cellulose derivative, a resin, an oil, a plasticizer, solvents and diluents, of a pigment containing a proportion of leaded zinc oxide.

11. The method of preventing the chalking and disintegration of coating compositions of the type wherein cellulose derivatives are used as a vehicle consisting in the admixture, with a coating composition containing nitrocellulose, damar resin, castor oil, dibutyl phthalate, solvents and diluents, of a pigment containing a proportion of leaded zinc oxide.

In testimony whereof, I affix my signature.

GEORGE R. ENSMINGER.